(No Model.)

G. R. CLEMENTS.
SAW FRAME.

No. 605,597.  Patented June 14, 1898.

Witnesses
Wm H. Edwards Jr.
Victor J. Evans

Inventor
George R. Clements
By John Wedderburn
Attorney

UNITED STATES PATENT OFFICE.

GEORGE R. CLEMENTS, OF ROCK CREEK, MINNESOTA.

SAW-FRAME.

SPECIFICATION forming part of Letters Patent No. 605,597, dated June 14, 1898.

Application filed August 24, 1897. Serial No. 649,325. (No model.)

*To all whom it may concern:*

Be it known that I, GEORGE R. CLEMENTS, residing at Rock Creek, in the county of Pine and State of Minnesota, have invented certain new and useful Improvements in Saw-Frames; and I do hereby declare the following to be a full, clear, and exact description of the invention, such as will enable others skilled in the art to which it appertains to make and use the same.

This invention relates to saw-frames; and it consists, essentially, of a tension-frame adapted to be removably connected to an elongated or crosscut saw to stiffen the same at the opposite end.

The invention further consists of the details of construction and arrangement of the several parts which will be more fully hereinafter described and claimed.

The object of the invention is to arrange a saw for use by one man by means of a removable frame and wherein the parts are simple and effective in their construction and operation, strong and durable, easily and readily applied, and comparatively inexpensive in the cost of manufacture.

Figure 1:
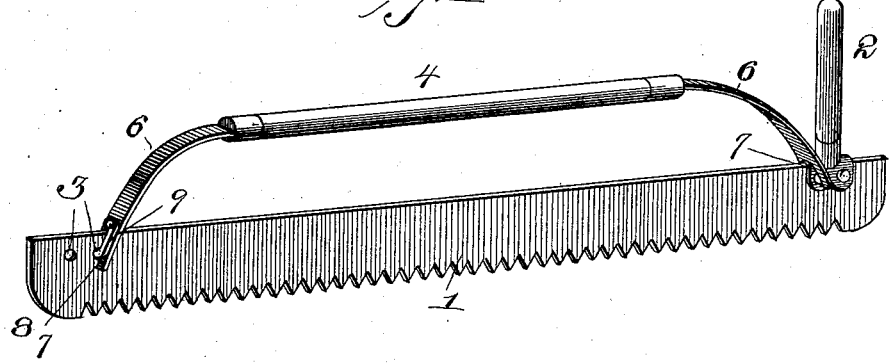
Figure 2:
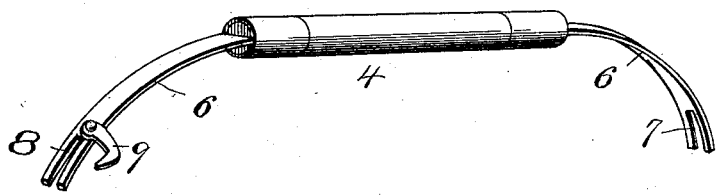

In the accompanying drawings, Figure 1 is a detail perspective view of a saw, showing the improved device applied thereto. Fig. 2 is a similar view of the improved attachment.

Referring to the drawings, wherein similar numerals of reference are employed to indicate corresponding parts in the views, the numeral 1 designates an elongated crosscut-saw which is usually provided with two upright grips or handles, one of which in this instance is dispensed with and only one used, as at 2. The saw at its opposite ends is provided with openings 3, which are intended to receive the securing devices of the handles or grips, and when one of the said handles or grips is disconnected the said openings are relieved at one end to be engaged by other devices.

The frame or attachment comprises a cylindrical grip or bar 4, having opposite end ferrules, and from the opposite ends of the said grip or bar extend spring-arms 6, the innermost of which is slotted, as at 7, and closely engages the securing devices of the grip or handle 2 and is inseparable therefrom under ordinary circumstances, owing to the frictional contact set up. The opposite arm 6 is also slotted, as at 8, and in addition has a latch 9 pivoted thereto, which is adapted to pass through one of the openings 3. By means of the tension exerted by the arms 6, which will be greater or less in accordance with the amount of bow of the same, the saw-blade is held sufficiently rigid to adapt it to be operated by a single person.

In the operation of the device constructed in accordance with the invention the grip or bar 4 may be grasped and the saw used in that manner, or the handle 2 will be engaged and the said grip or bar and spring-arms hold the blade sufficiently taut to permit a proper sawing operation.

Having thus described the invention, what is claimed as new is—

1. As an improved article of manufacture, a saw-frame consisting of a grip, curved spring-arms independent of said grip and having their adjacent ends secured to the ends of the grip and their other ends slotted to engage over the edge of a saw, and means movably mounted on one of said arms for detachably connecting said slotted ends to the ends of a saw, as set forth.

2. As an improved article of manufacture, a saw-frame consisting of a grip, curved spring-arms independent of the grip and having their adjacent ends secured to the ends of the grip and their other ends slotted to engage over the edge of a saw, and a latch pivoted on the outer end of one of said arms to engage an opening in the saw, the other arm being frictionally held upon the saw, substantially as specified.

3. The combination with a saw having an upright handle at one end and openings near the upper edge at the opposite end, of a saw-frame consisting of a grip with ferrules at its ends, curved spring-arms independent of the grip and secured to opposite ends thereof, the outer ends of the arms being slotted, the slotted end of one arm being frictionally held against the securing device of the said upright handle, and a pivoted latch on the outer end of the other arm to engage one of the openings in the saw, substantially as described.

In testimony whereof I have signed this specification in the presence of two subscribing witnesses.

GEORGE R. CLEMENTS.

Witnesses:
JAMES H. WAUDEL,
CHAS. A. NASON.